United States Patent
Yun

(10) Patent No.: US 10,960,284 B2
(45) Date of Patent: Mar. 30, 2021

(54) DIVOT-DETECTING GOLF SWING MAT

(71) Applicant: Ji Nyeong Yun, Yongin (KR)

(72) Inventor: Ji Nyeong Yun, Yongin (KR)

(*) Notice: Subject to any disclaimer, the term of this patent is extended or adjusted under 35 U.S.C. 154(b) by 0 days.

(21) Appl. No.: 16/336,312

(22) PCT Filed: Sep. 29, 2017

(86) PCT No.: PCT/KR2017/010916
§ 371 (c)(1),
(2) Date: Mar. 25, 2019

(87) PCT Pub. No.: WO2018/062931
PCT Pub. Date: Apr. 5, 2018

(65) Prior Publication Data
US 2019/0217178 A1    Jul. 18, 2019

(30) Foreign Application Priority Data

Sep. 29, 2016 (KR) .................. 10-2016-0125450
Sep. 21, 2017 (KR) .................. 10-2017-0121966

(51) Int. Cl.
*A63B 69/36* (2006.01)
*A63B 71/06* (2006.01)
(Continued)

(52) U.S. Cl.
CPC ...... *A63B 69/3614* (2013.01); *A63B 69/3623* (2013.01); *A63B 69/3661* (2013.01);
(Continued)

(58) Field of Classification Search
CPC .......... A63B 69/3661; A63B 2069/362; A63B 69/3614; A63B 69/3623; G06F 3/041
(Continued)

(56) References Cited

U.S. PATENT DOCUMENTS

| 7,329,193 B2 | 2/2008 | Plank, Jr. |
| 2006/0030432 A1* | 2/2006 | Katayama ......... A63B 24/0003 473/407 |

(Continued)

FOREIGN PATENT DOCUMENTS

| JP | 8234895 A | 9/1996 | |
| JP | H 08-234895 A * | 9/1996 | ............... G06F 3/03 |

(Continued)

OTHER PUBLICATIONS

English machine translation of JPH 08-234895 A (Year: 1996).*
Other—Office Action from co-pending Chinese application dated May 21, 2020.

*Primary Examiner* — Laura Davison
(74) *Attorney, Agent, or Firm* — Patentfile, LLC; Bradley C. Fach; Steven R. Kick

(57) ABSTRACT

The present invention relates to a divot-detecting golf swing mat and, more particularly, to a divot-detecting golf swing mat characterized by comprising: a hitting mat (110) having artificial turf (111) formed on the upper side thereof such that a golf ball (B) can be seated thereon; a divot-detecting sensor array portion (120) installed beneath the hitting mat (110) so as to measure hitting of a club head (H), which is transferred through the hitting mat (110), through sensors arranged in an array type; a control portion (130) for calculating information regarding hitting of the club head (H) sensed by the divot-detecting sensor array portion (120); a golf ball position designating portion (150) installed on a side surface of the rear side of the hitting mat (110) so as to designate the position of the golf ball (B); and a display portion (140) for displaying the information regarding hitting of the club head (H) and the position of the golf ball (B).

4 Claims, 18 Drawing Sheets

(51) Int. Cl.
G06F 3/041 (2006.01)
A63B 67/02 (2006.01)
(52) U.S. Cl.
CPC .............. A63B 67/02 (2013.01); A63B 71/06 (2013.01); A63B 2220/805 (2013.01); G06F 3/041 (2013.01)
(58) Field of Classification Search
USPC ......................................................... 473/220
See application file for complete search history.

(56) References Cited

U.S. PATENT DOCUMENTS

2008/0242437 A1* 10/2008 Taylor ................ A63B 24/0021
473/269
2014/0228085 A1* 8/2014 Suk ......................... A63F 13/80
463/3
2016/0246396 A1* 8/2016 Dickinson .............. G06K 9/209

FOREIGN PATENT DOCUMENTS

| | | |
|---|---|---|
| JP | 11333041 | 7/1999 |
| JP | 2009101148 A | 5/2009 |
| KR | 100589458 B1 | 6/2006 |
| KR | 1020050086248 | 6/2006 |
| KR | 1011481620000 | 5/2012 |

* cited by examiner (a)

(b)

DIVOT-DETECTING GOLF SWING MAT

This Application is a 35 U.S.C. 371 National Stage Entry of International Application No. PCT/KR2017/010916 filed on Sep. 29, 2017, which claims the benefit of Republic of Korea Patent Application No. 10-2016-0125450, filed on Sep. 29, 2016 and Republic of Korea Patent Application No. 10-2017-0121966 filed on Sep. 21, 2017, the entire disclosures of which are incorporated by reference herein.

TECHNICAL FIELD

The present invention relates to a divot-detecting golf swing mat, and more particularly, to a divot-detecting golf swing mat characterized by comprising: a hitting mat 110 having artificial turf 111 formed on the upper side thereof such that a golf ball B can be seated thereon; a divot-detecting sensor array portion 120 installed beneath the hitting mat 110 so as to measure hitting of a club head H, which is transferred through the hitting mat 110, through sensors arranged in an array type; a control portion 130 for calculating information regarding hitting of the club head H sensed by the divot-detecting sensor array portion 120; a golf ball position designating portion 150 installed on a side surface of the rear side of the hitting mat 110 so as to designate the position of the golf ball B; and a display portion 140 for displaying the information regarding hitting of the club head H and the position of the golf ball B.

BACKGROUND ART

In general, golf is a sport in which when the moment of impact is perpendicular to the target direction, and the swing path is inside to inside, the flight of the ball becomes longer, and the directionality becomes correct, resulting in a correct seating of the ball on the fairway or green. In order to learn such an accurate golf swing, a lot of practice is required. If it practices swing indoors and has an exercise device that may analyze the swing, it will be able to practice without any time and place restrictions while saving money, and thus, it will be possible to acquire accurate swing as soon as possible. Therefore, there are a large number of driving ranges that may be practiced.

However, due to the differences in characteristic of the golf field turf illustrated in FIG. 1(A) and the rubber mat in the driving range illustrated in FIG. 1(B), there are many people complaining that the ball is not unnaturally hit in the fields although the ball is well hit and flown away in the driving range. As illustrated in FIG. 1(A), since the field turf is long, has wide leaves, is weak, is not dense, and is grown to be wide and spread, the ball is sunken somewhat. On the other hand, as illustrated in FIG. 1(B), since the artificial turf on the driving range mat is short and stuck with a piece of plastic, the ball is floated. Thus, the ball is entirely visible on the mat but is sunken into the turf in the field. Thus, it gives a different visual impression. Also, when amateur golfers practices in the driving range, there are a lot of people that causes the duff. The impact of the duff not only brings pain to the wrists, elbows, and shoulders, but also causes injuries in severe cases.

The mat of the driving range is hard, and as illustrated in FIG. 2, even if the duff occurs, the club slides forward and strikes the ball, and thus, people are mistaken for good shot. However, since dirt is under the turf, when duff occurs, the club head may not slip and not hit the ball while digging the ground, and thus pull out the ground to cause the short driving distance as illustrated in FIG. 3.

As described above, in order to reduce the difference between the actual field and the driving range mat, down blow shot as shown in FIG. 4 has to be performed. The down blow shot first may hit the ball downwards, and thus, it is preferable that the divot is left in front of the golf ball. On the other hand, the case in which the divot is left behind the golf ball is a case in which the club head is duffed first. Here, weight does not move but remains on the left, or the club is quickly uncorked to cause the duff (fat shot).

As illustrated in FIG. 5, in the case of topping that hits the top of a golf ball, the golf ball has low trajectory, resulting in miss shot (so-called snake shot) that has fewer spins and rolls out more or less than its distance.

Also, as illustrated in FIG. 6, the so-called ax shot is similar to the swing of the topping except that the lowermost point of the swing of the topping is near the middle of the golf ball, whereas the lowermost point of the swing of the ax shot is the bottom of the golf ball. In this case too, there is a high risk of injury.

In the conventional existing golf swing mat, there is a problem that the club head slides on the mat bottom to hit the ball and thus cause more flying distance than the turf even though the duff occurs. However, in the conventional golf swing mat, it is impossible to know whether the duff occurs.

As the related art for solving such a problem and knowing whether duff occurs on the practice mat, as illustrated in FIG. 7, techniques have been proposed to attach a thermal paper on a mat that changes a color by frictional heat and to allow a user to visually check a mark of the club head, which occurs by friction of the club head after shot. However, the practice mat is inconvenient because the use frequency is very limited, and it is not be reused. Therefore, it is not suitable for continuous use for practice and remains at a level that may be used several times for analysis.

Another conventional technique is to use a slide mat as illustrated in FIG. 8, and when mat is hit, the slide mat slides in an advancing direction of a ball to provide feedback such as natural turf. In this case, although there is an advantage in that an impact applied when the mat is slid to be duff is prevented, when hitting the back of the ball, the mat starts moving, and thus, the ball is hit with much less force than a case in which the mat is fixed, resulting in losing a driving distance. In addition, since it does not confirm that how much the club head is duffed, and the mat moves, the user feels somewhat awkward at first.

As further another existing technique that approaches tendency of giving a sense of turf to the practice mat, proposed are a method in which a block of a gel material below an artificial turf is disposed to provide resistance for preventing a club head from slipping smoothly in the ball advancing direction when the mat is hit as illustrated in FIG. 9 and a method of giving feedback of natural turf by hitting a rubber mat floated by repulsive force of magnetic field under the mat as illustrated in FIG. 10. However, both of these methods are merely related to the structure of the rubber mat which is intended to give the feeling of the natural turf, and there is no quantitative feedback function of divot information.

In another related prior art, as disclosed in "Apparatus For Training Golf Swing (Korean Utility Model Registration No. 20-0323906)" in the following patent document 1, the apparatus includes a bottom having a plurality of grooves, each of which has a predetermined space therein, a plurality of detecting pins mounted in the space within the groove and having a first state vertically erected and a second state laid in a horizontal direction by hitting of a golf club head, a plurality of light emitting diodes arranged corresponding to the detection pins to determine whether to turn on or off according to a state of the corresponding detection pin, and a control circuit for turning on or off the light emitting diodes according to the state of the detection pin. In the case of this conventional prior art, when the club head hits the detection pin, the light emitting diodes connected to the detection pin are turned on to determine a swing path of the club head and a state of a club head face (perpendicular to a target direction, open, or close) through the turn on/off state of each of the light emitting diodes. However, due to limitations of the configuration using the detection pin, it is necessary to interfere with the swing, and also, only the direction of the swing trajectory is detected merely, and hitting force in the vertical direction related to the duff is not be detected at all.

DISCLOSURE OF THE INVENTION

Technical Problem

To solve the above problems of the related arts, an object of the present invention is to provide a divot-detecting golf swing mat which detects various pieces of information, which are capable of being obtained when a golf club hits the mat, such as an existence/nonexistence and position of a golf ball, a position, depth, and direction of a divot, and the like to display the information to a user so that the user consciously practices the swing while correctly shifting weight to allow the divot to be generated in the front of the ball to improve shot-making ability and also reduce differences between a driving range and a field.

Technical Solution

To achieve the above object, the present invention relates to a divot-detecting golf swing mat and, more particularly, to a divot-detecting golf swing mat including: a hitting mat 110 having artificial turf 111 formed on an upper side thereof so that a golf ball B is seated thereon; a divot-detecting sensor array portion 120 installed beneath the hitting mat 110 so as to measure hitting of a club head H, which is transferred through the hitting mat 110, through sensors arranged in an array form; a control portion 130 for calculating information regarding the hitting of the club head H detected by the divot-detecting sensor array portion 120; a golf ball position designating portion 150 installed on a side surface of the rear side of the hitting mat 110 so as to designate the position of the golf ball B; and a display portion 140 for displaying the information regarding hitting of the club head H and the position of the golf ball B.

Also, in the divot-detecting sensor array portion 120, the sensors may be one-dimensionally arranged in a direction perpendicular to a swing direction of the club head H or two-dimensionally arranged in the swing direction of the club head H, the display portion 140 may include one or more of LED array displays 141 one-dimensionally arranged in the swing direction of the club head H, and the golf ball position designation portion 150 may include one or more of a touch screen portion 151, a button switch portion 152 or a proximity sensor 153 to transmit a contact position of the club head H to the control portion 130 so that the LED array display moves to left or right sides to designate the position of the golf ball B.

Also, the touch screen portion 151 may be constituted by touch sensors one-dimensionally arranged in the swing direction of the club head H, and the control portion 130 may determine the position of the golf ball B according to the contact position of the club head H contacting the touch screen portion 151.

Also, the control portion 130 may generate divot information including one or more of a position of the divot, a depth of the divot, and a direction of the divot according to hitting information of the club head H, and the divot-detecting golf swing mat may further include: a voice output portion 160 further connected to the control portion 130 to convert the divot information to a voice; a camera 171 further connected to the control portion 130 to photograph the position of the golf ball B so as to be transmitted to the control portion 130; a temperature sensor portion 172 further connected to the control portion 130 to measure a temperature for compensating temperature characteristics of the divot-detecting sensor array portion 120; and an advertisement display portion 180 further connected to the control portion 130 to display an advertisement.

Also, the divot-detecting golf swing mat may further include a wired or wireless transmitting or receiving portion 170 further connected to the control portion 130 to transmit the hitting information of the club head H to a golf simulation system or a portable terminal of a user in a wired or wireless manner.

Also, a divot-detecting golf swing mat includes: a hitting mat 110 having artificial turf 111 formed on an upper side thereof so that a golf ball B is seated thereon; a divot-detecting sensor array portion 120 installed beneath the hitting mat 110 so as to measure hitting of a club head H, which is transferred through the hitting mat 110, through sensors arranged in an array form; and a control portion 130 for calculating information regarding the hitting of the club head H transmitted from the divot-detecting sensor array portion 120, wherein, when a user steps on the golf ball B for a predetermined time in a state in which the golf ball B is placed on an upper portion of the hitting mat 110, the divot-detecting sensor array portion 120 detects a position of the golf ball B so as to be transmitted to the control portion 130.

Also, the divot-detecting sensor array portion 120 may include: a body plate 122 made of an elastic material and having a plurality of first through-holes 122a in a direction perpendicular to a swing direction of the club head H; a first light emitting portion 123 formed on one side of the body plate 122 and provided with a first light emitting sensor 123a at a position corresponding to a through hole of the plurality of first through-holes 122a, a first light receiving portion 124 formed on the other side of the body plate 122 and provided with a first light receiving sensor (124a), which is formed at a position corresponding to a through hole of the plurality of first through-holes 122a to recognize light passing through the plurality of first through-holes 122a and generated from the first light emitting portion 123, and a sensor signal detecting portion 121 connected to the first light emitting portion 123 and the first light receiving portion 124 to measure an amount of light passing through the plurality of first through-holes 122a and transmit the measured amount of light to the control portion 130.

Also, a plurality of second through-holes 122b may be formed in the body plate 122 in a direction perpendicular to the plurality of first through-holes 122a and a second light emitting portion 125 provided with a plurality of second light emitting sensors 125a at a position corresponding to each of the plurality of second through-holes 122b on a distal end of the body plate 122 and a second light receiving portion 126 provided with a plurality of second light receiving sensors 126a, which is formed at a position corresponding to the plurality of second through-holes 122b to recognize light passing through the plurality of second through-holes 122b and generated from the second light emitting portion 125 on a front end side of the body plate 122 may be provided, wherein the sensor signal detecting portion 121 may measure an amount of light passing through the plurality of second through-holes 122b to transmit the measured amount of light to the control portion 130.

Advantageous Effects

According to the present invention, the object of the present invention is to provide the divot-detecting golf swing mat which detects the various pieces of information, which are capable of being obtained when the golf club hits the mat, such as the existence/nonexistence and position of the golf ball, the position, depth, and direction of the divot, and the like to display the information to the user so that the user consciously practices the swing while correctly shifting weight to allow the divot to be generated in the front of the ball to improve the shot-making ability and also reduce the differences between the driving range and the field.

MODE FOR CARRYING OUT THE INVENTION

Figure 1:
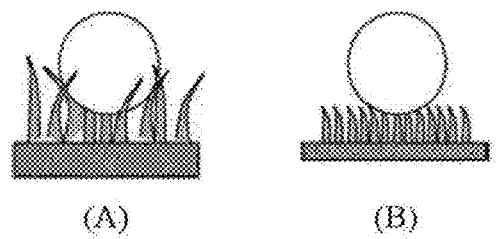
FIG. 1 is a view illustrating a difference between a golf field turf and a driving range mat.
Figure 2:
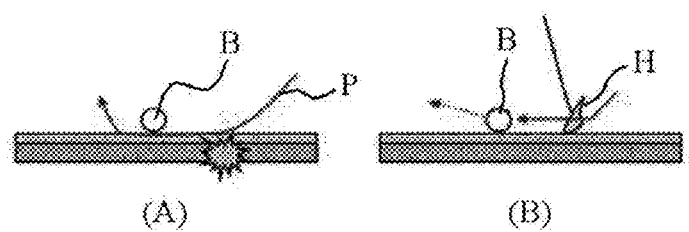
FIG. 2 is a view illustrating a case of duff in a driving range.
Figure 3:
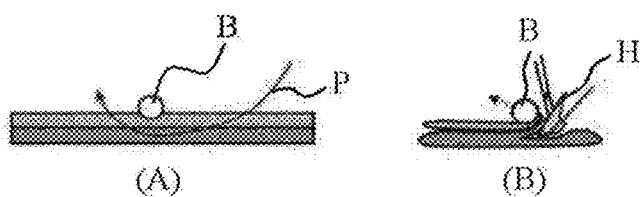
FIG. 3 is a view illustrating a case of duff in a golf field.
Figure 4:
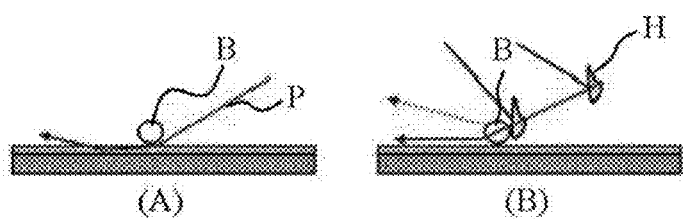
FIG. 4 is a view illustrating a case of down blow shot.
Figure 5:
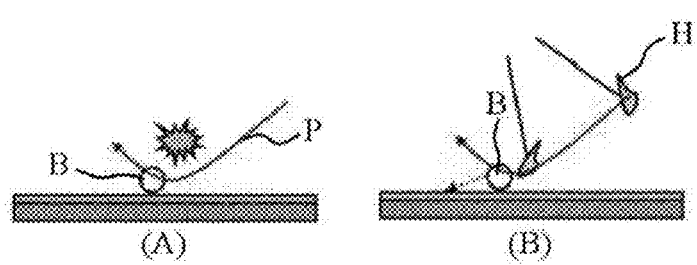
FIG. 5 is a view illustrating a case of topping.
Figure 6:
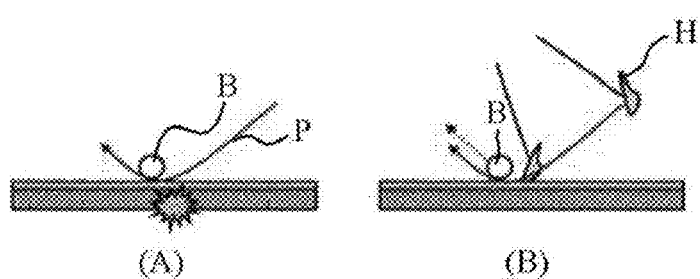
FIG. 6 is a view illustrating a case of ax shot.
Figure 7:
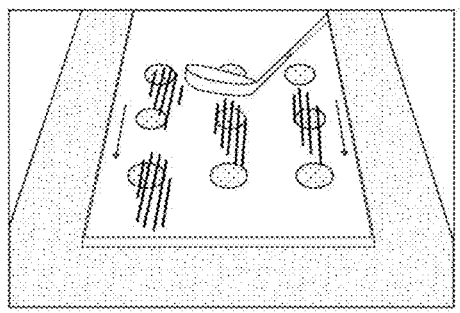
FIG. 7 is a view illustrating an example of the existing invention using thermal paper.
Figure 8:
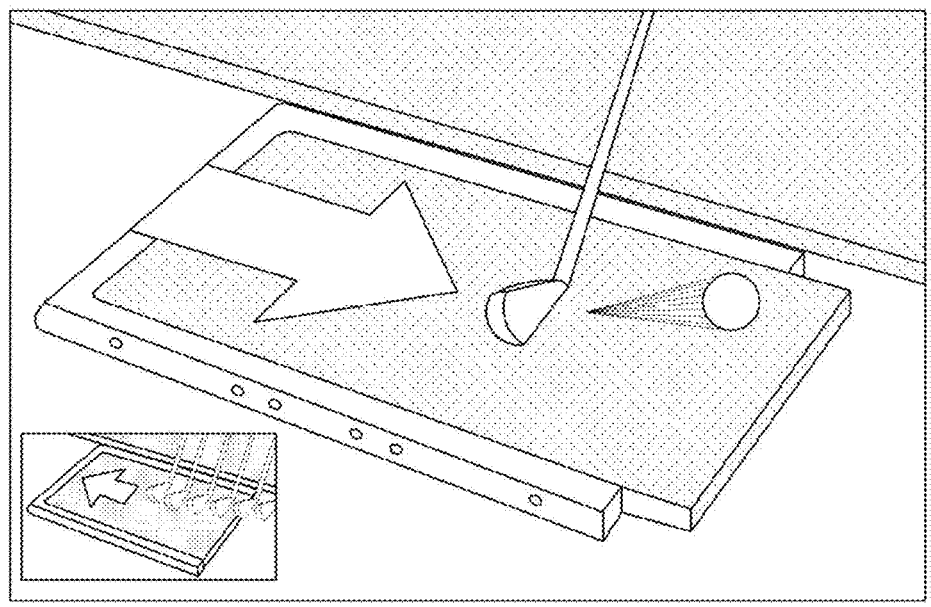
FIG. 8 is a view illustrating an example of the existing invention using a slide mat.
Figure 9:
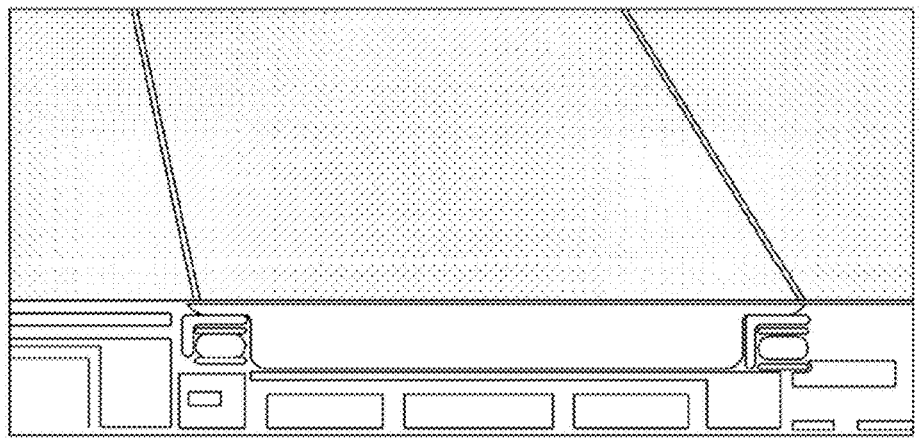
FIG. 9 is a view illustrating an example of the existing invention using a gel block.
Figure 9:
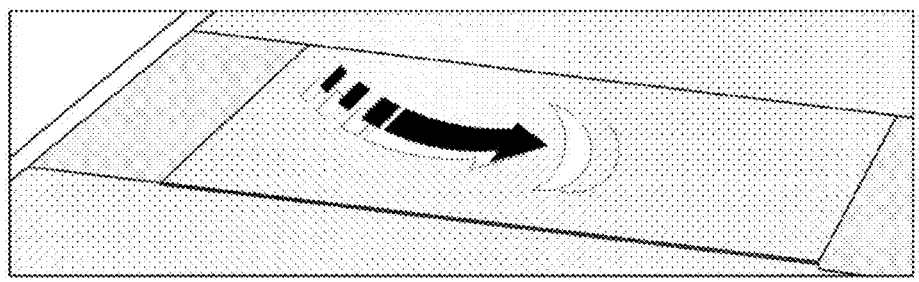
Figure 10:
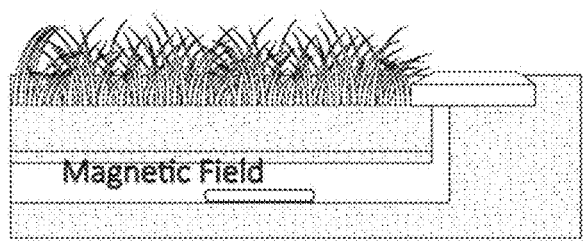
FIG. 10 is a view illustrating an example of the existing invention using a magnetic field.

Hereinafter, a divot-detecting golf swing mat according to embodiments of the present invention will be described in detail with reference to the accompanying drawings. It is also noted that like reference numerals denote like elements in appreciating the drawings. In the description of the present invention, detailed descriptions related to well-known functions or configurations will be ruled out in order not to unnecessarily obscure subject matters of the present invention.

Figure 11:
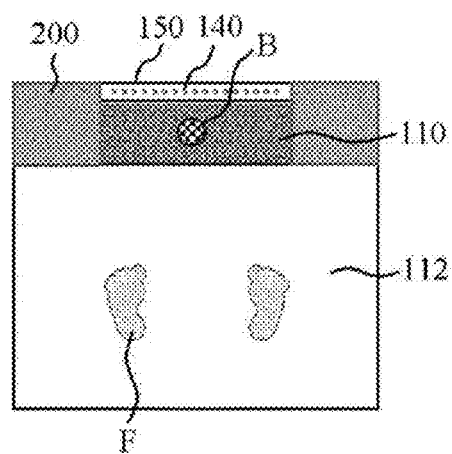
FIG. 11 is a top view of a divot-detecting golf swing mat according to an embodiment of the present invention.
Figure 12:
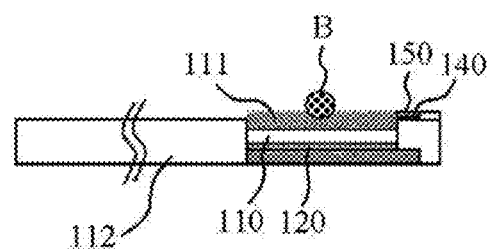
FIG. 12 is a side cross-sectional view of the divot-detecting golf swing mat according to an embodiment of the present invention.
Figure 13:
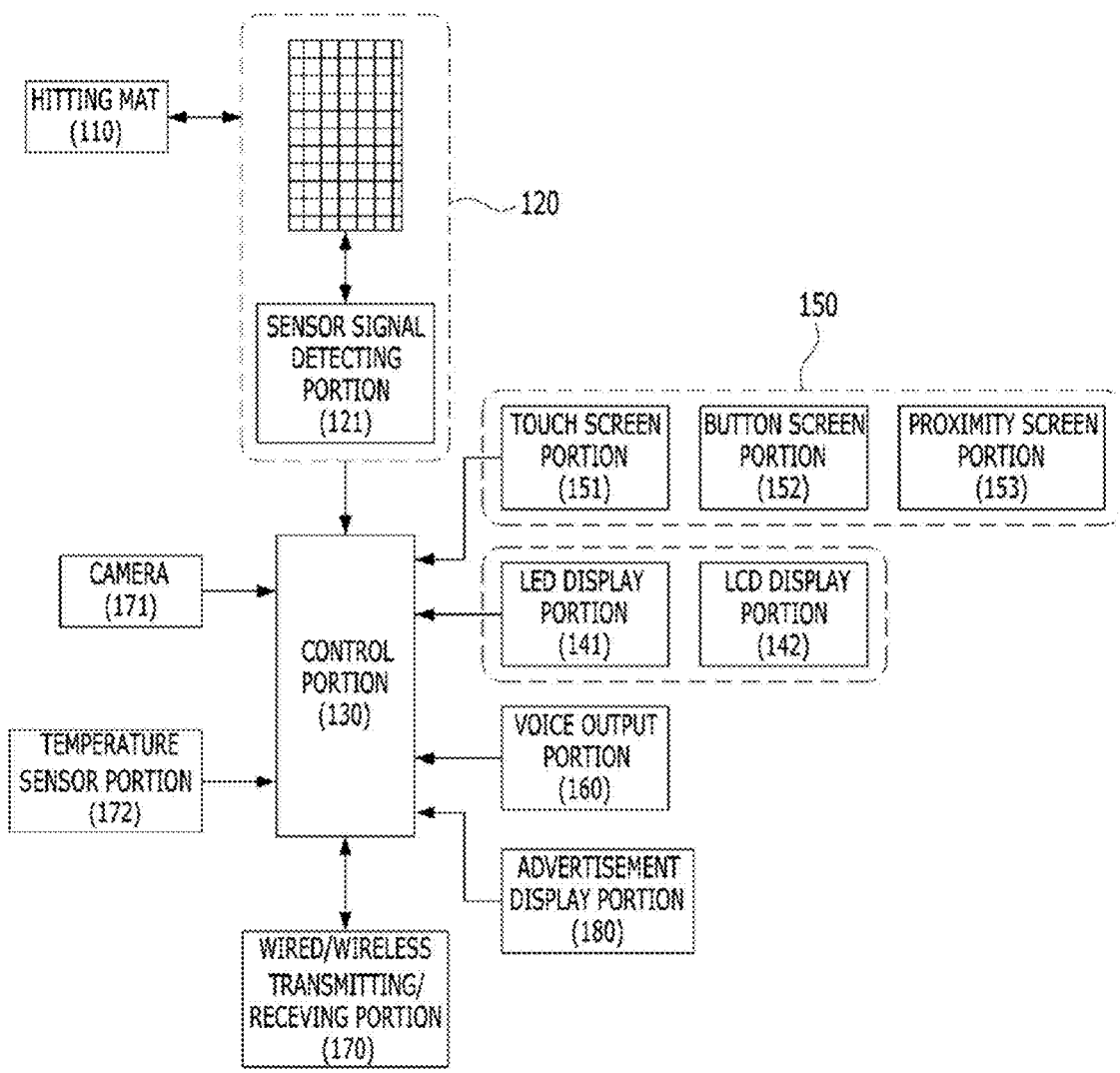
FIG. 13 is a block diagram of the divot-detecting golf swing mat according to an embodiment of the present invention.

As illustrated in FIGS. 11 to 13, a divot-detecting golf swing mat according to an embodiment of the present invention includes a hitting mat 110, a divot-detecting sensor array portion 120, a control portion 130, a display portion 140, and a golf ball position designation portion 150.

First, the hitting mat 110 will be described. As illustrated in FIGS. 11 and 12, an artificial turf 111 on which a golf ball B is seated is installed on the hitting mat 110. When the artificial turf 111 is worn out due to continuous friction with a club head H to decrease in height, golf ball hit feeling is worse. Thus, it is preferable that the hitting mat 110 is configured so that only the hitting mat to which the artificial turf 111 adheres is mounted to be replaceable.

Next, the divot-detecting sensor array portion 120 will be described. As illustrated in FIGS. 11 and 12, the divot-detecting sensor array portion 120 is installed below the hitting mat 110 to detect hitting of the club head H, which is transmitted through the hitting mat 110, through sensors arranged in an array form.

In this case, each of the sensors may include one of various sensors such as a force resistive sensor (FSR), a piezoelectric element, an impact sensor, an electrostatic sensor, a proximity sensor, a tensile sensor (detects a degree of deflection of a rubber mat), a load cell, a strain gauge, an optical sensor, and the like. However, the present invention is not limited to a specific sensor. When the specific sensor is selected, a sensor response speed and a temperature characteristic are very important. In order to compensate the temperature characteristic of the sensor, as illustrated in FIG. 13, it is preferable that a temperature sensor portion 172 further connected to the control portion 130 to measure a temperature for compensating temperature characteristics of the divot-detecting sensor array portion 120 is further provided. An outdoor golf mat has to be able to operate at temperatures between −20 degrees and 50 degrees. However, since a degree of reaction in the general sensor varies depending on the temperature, it is preferable that the sensor senses the temperature so that the sensor equally responds to an absolute impact amount to compensate the sensed value for use in real time.

Also, in order to convert an output of a pure sensor outputted in the form of an analog voltage or current corresponding to an amount of change in amount of impact, pressure, force, or length according to the characteristics of the sensor, as illustrated in FIG. 13, a sensor signal detecting portion 121 may be further provided. The sensor signal detecting portion 121 is generally configured to convert the analog voltage or current into a digital value through a signal filter circuit, a signal amplifier, and an AD converter. A technology for implementing the sensor signal detecting portion 121 is well known and widely used in the fields of sensor measurement, and thus detailed descriptions thereof will be omitted.

Figure 14:
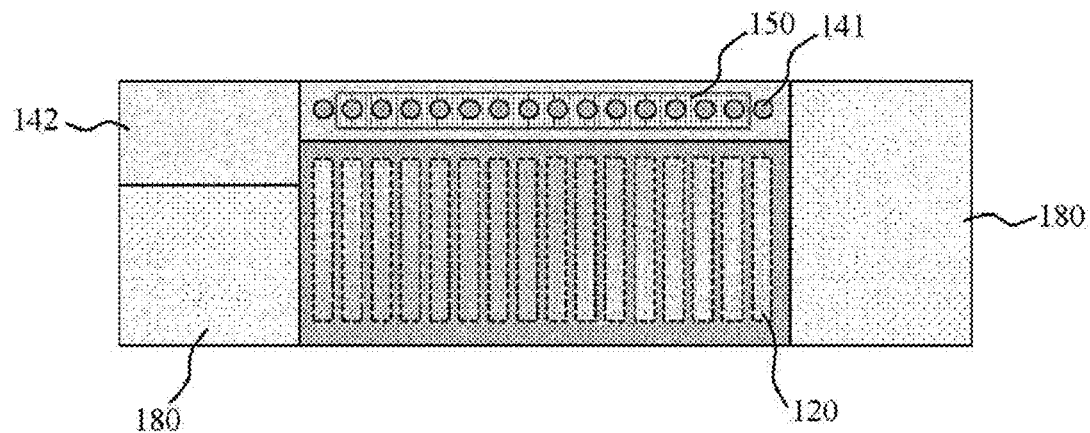
FIG. 14 is a schematic view of a divot-detecting golf swing mat according to a first embodiment of the present invention.
Figure 16:
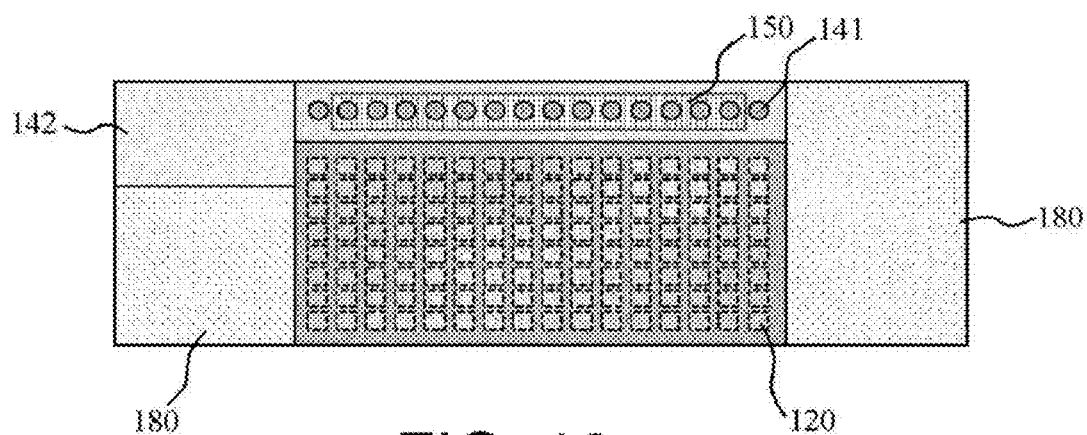
FIG. 16 is a schematic view of a divot-detecting golf swing mat according to a second embodiment of the present invention.

The sensors constituting the divot-detecting sensor array portion 120 may be one-dimensionally (1D) arranged as described in the first embodiment of FIG. 14 or two-dimensionally (2D) arranged as described in the second embodiment of FIG. 16. That is, in the divot-detecting sensor array portion 120, the sensors may be one-dimensionally arranged in a swing direction of the club head H, like the first embodiment of FIG. 14 or may be two-dimensionally arranged on a plane parallel to the hitting mat 110, like the second embodiment of FIG. 16. As described above, in the case of the 2D array, there is an advantage in that the direction of the divot is capable of being detected, but a sensor processing portion is complicated, and a price is high. The more a size of a unit sensor decreases, the more length detection resolution increases.

The hitting mat 110 and the divot-detecting sensor array portion 120 may be separated from each other. However, in order to improve sensing sensitivity, a form in which the divot-detecting sensor array portion 120 adheres to a lower end of the hitting mat 110, a form in which the divot-detecting sensor array portion 120 is built in the hitting mat 110, and a form in which the hitting mat 110 itself serves as the divot-detecting sensor array portion 120 due to the sensing principle.

Next, the control portion 130 will be described. As illustrated in FIG. 13, the control portion 130 controls the display portion 140 so that the display portion 140 displays hitting information of the club head H, which transmitted from the divot-detecting sensor array portion 120. That is, the control portion 130 is configured so that divot information including one or more of a divot position, a divot depth, and a divot direction is generated based on the hitting information of the club head H, and then, the generated divot information is displayed to a user through the display portion 140 or a voice output portion 160 that will be described later so as to provide feedback.

Also, the control portion 130 may also specify the position of the golf ball B manipulated by the golf ball position designation portion 150 to display the position of the golf ball B together on the display portion 140.

Next, the display portion 140 will be described. As illustrated in FIG. 13, the display portion 140 is connected to the control portion 130 to display the hitting information (i.e., the divot information including one or more of the divot position, the divot depth, and the divot direction) of the club head H so as to be feedback to the user. In this case, the display portion 140 may include one or more of an LED array display 141 in which LEDs are one-dimensionally arranged in the swing direction of the club head H, like the first embodiment of FIG. 14 or an LED panel display 142 having a panel shape, like the third embodiment of FIG. 19.

Next, the golf ball position designation portion 150 will be described. The golf ball position designation portion 150 provides a mean for designating the position of the golf ball B placed on the hitting mat 110 so as to hit the golf ball B. In this case, the golf ball position designation portion 150 may be implemented according to various embodiments.

According to an embodiment, a touch screen portion 151 having a pressure-sensitive structure, which is one-dimensionally arranged in the swing direction of the club head H, is mounted on a rear one surface of the hitting mat 110 by a length corresponding to a size of the LED array display 141 to specify the position of the ball at a contact position of the club head H.

The touch screen portion 151 may perform a function to simply receive various inputs that are necessary for operation by only touching the golf club in consideration of characteristics in which the user is mainly used in a standing posture with the golf club.

Figure 20:
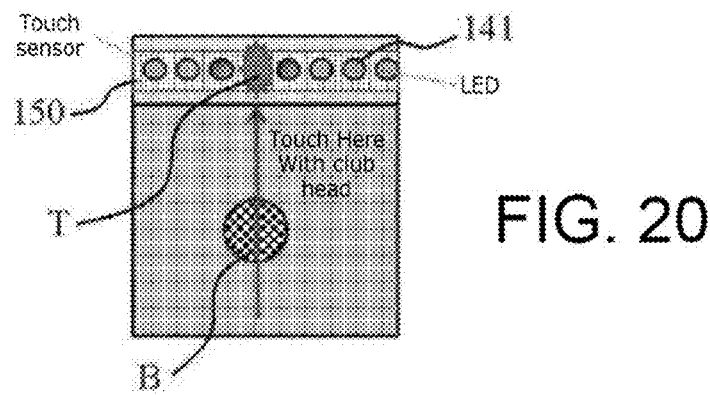
FIG. 20 is a view illustrating a golf ball position designation operation of the divot-detecting golf swing mat according to the first embodiment of the present invention.

In this case, the touch screen portion 151 is constituted by touch sensors one-dimensionally arranged in the swing direction of the club head H as illustrated in FIG. 14. When the user allows the golf club head to contact the touch screen portion 151 disposed at a position corresponding to the golf ball B as illustrated in FIG. 20, the control portion 130 recognizes the position to display the position of the ball by turning on the LEDs corresponding to the position of the golf ball B on the LED array display 141 as illustrated in FIG. 15(A). According to another embodiment, single or plural button switch portions 152 may be pushed, or the club head H may come close to single or plural proximal switch portions 153, which is capable of sensing a metal, as illustrated in FIG. 14 so that a position of a golf ball position indicating LED that is illuminated with a blue color moves to left and right sides to designate the corresponding position as the position of the golf ball B as illustrated in FIG. 15(A).

According to further another embodiment, as illustrated in FIG. 14, single or plural button switch portions 152 may be physically pressed, or the club head H may come close to single or plural proximal switch portions 153 so that a position of a golf ball position indicating LED that is illuminated with a blue color moves to left and right sides to designate the corresponding position as the position of the golf ball B as illustrated in FIG. 15(A).

Figure 21:
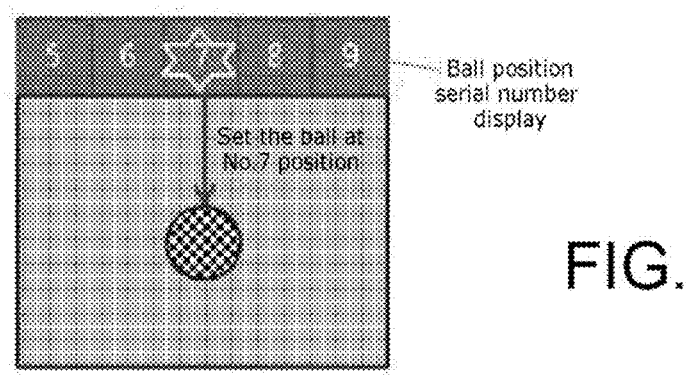
FIG. 21 is a view illustrating another golf ball position designation operation of the divot-detecting golf swing mat according to the first embodiment of the present invention.

Also, according to further another embodiment, as illustrated in FIG. 21, a position at which the golf ball B has to be placed may be designated on the display portion 140 to locate the golf ball B at a position corresponding to an extension line of the designated position. That is, the position may be designated at equal intervals in a line to locate the golf ball B at a position corresponding to "7", which is randomly selected by the user, of positions expressed by figures (an interval of the figures corresponds to an interval of one ball). In this case, although it is unnecessary to perform the ball position display and the moving operation by the switch as described above, the ball position has to be remembered by the user so that whether the duff occurs is determined based on divot display information.

According to further another embodiment, in a state in which the golf ball B is placed on an upper portion of the hitting mat 110 without the touch screen portion 151, the button switch portion 152, or the proximity switch portion 153, when the user presses the golf ball B for a predetermined time, the position of the golf ball B may be detected by the divot-detecting sensor array portion 120 to determine the position of the ball by the control portion 130.

Also, as illustrated in FIG. 13, it is preferable that the voice output portion 160 further connected to the control portion 130 to convert the divot information into a voice is further provided. That is, the purpose is to transmit the results of the shot through the voice such as "duff", "good shot", or the like so as to audibly display the divot detection information to the user. Also, instructions on how to use, system error information, and the like may be transmitted to the user through voice messages.

In order to automatically detect the position of the golf ball B, it is preferable that a camera 171 further connected to the control portion 130 to photograph the position of the golf ball B so as to photograph a swing motion of the user, which is transmitted to the control portion 130, is further provided. In this case, when the camera 171 is connected to an external golf simulation system through a wired or wireless transmitting or receiving portion 170 to be described later, it is also possible to use the camera of the golf simulation system for photographing the user's swing motion or the like.

Also, as illustrated in FIGS. 13 and 14, it is preferable that an advertisement display portion 180 connected to the control portion 130 to display an advertisement is further provided.

In order to operate in cooperation with the external golf simulation system such as the screen golf or a portable terminal of the user, in which a specific application is installed, it is preferable that, as illustrated in FIG. 13, the divot-detecting golf swing mat further includes the wired or wireless transmitting or receiving portion 170 further connected to the control portion 130 to transmit the hitting information of the club head H to the golf simulation system or the portable terminal of the user in a wired or wireless manner.

Since the screen golf driving range also uses the rubber mat, the driving distance is more distant than the actual turf when the divot occurs. Thus, since it does not reflect actual field conditions except for driver tee shot that uses a tee, it is a common phenomenon that a screen golf score is less than 10 times less than in the actual field. Thus, when the divot-detecting golf mat proposed in the present invention is applied to the golf simulation system such as the screen golf, a corrected distance may be calculated by reflecting the above-described divot information to a unique driving distance of the screen golf and a hit ball direction calculation algorithm by utilizing the transmitted divot information. Also, when imaging and displaying the divot position and both directions of the divot with respect to the ball on the screen, or displaying an image of the peel-off turf, it has an advantage of providing vivid and intuitive virtual reality to the user. The present invention is not limited to a specific wired or wireless communication method for the purpose of transmitting or receiving data and may include various Internet connection means. On the other hand, when applied to the screen golf system, an input/output device of the screen golf system may be utilized. Thus, some or all of the components such as the display portion 140, the touch switch portion 150, the voice output portion 160, and the camera 171 related to the input/output device of the components may be replaced with the input/output device of the screen golf system so as to be used.

Also, system status information, failure diagnosis, sensor calibration, and check may be performed through the wired or wireless transmitting or receiving portion 170. Also, the system status may be confirmed, a program update operation may be performed, and a remote management function for a plurality of systems may be implemented through the Internet connection means.

Next, an operation of the divot-detecting golf swing mat according to an embodiment of the present invention will be described.

Figure 15:
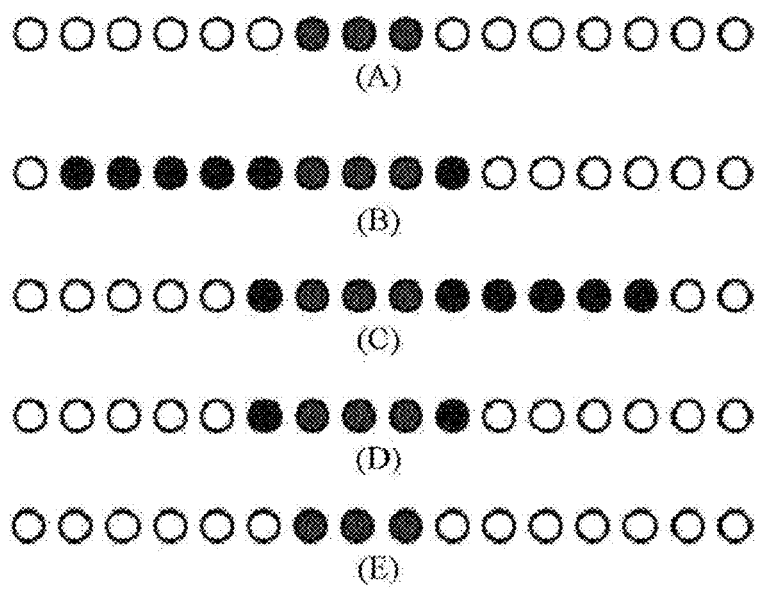
FIG. 15 is a view illustrating a turn on/off method of the divot-detecting golf swing mat according to the first embodiment of the present invention.

First, an operation of the divot-detecting golf swing mat according to a first embodiment (the one-dimensional sensor array/one-dimensional LED array display) of the present invention, which is the simplest embodiment, will be described with reference to FIGS. 14 to 15.

In this case, the golf ball position designation portion 150 includes the touch screen portion 151. As illustrated in FIG. 20, the control portion 130 may recognize the position of the golf ball B by contacting the touch screen portion 151 corresponding to the position at which the golf ball B is placed with the club head. Alternatively, as illustrated in FIG. 14, the control portion 130 may recognize the position of the golf ball B by pushing the single or plural button switch portions 152 or allowing the club head H to come close to the single or plural proximity switch portions 153. The position of the golf ball B may be automatically recognized by the control portion 130 through an image of the golf ball B photographed through the camera 171. The position of the golf ball B recognized as described above is displayed on the LED array display 141 (indicated with the blue color in FIG. 15(A)).

As another method of implementing the golf ball position designation portion for specifying the position of the golf ball B, as illustrated in FIG. 21, it is also possible to designate the position at which the golf ball B has to be placed on the display portion 140 to locate the golf ball B at a position corresponding to an extension line of the designated position. That is, the position may be designated at equal intervals in a line to locate the golf ball B at a position corresponding to "7", which is randomly selected by the user, of positions expressed by figures (an interval of the figures corresponds to an interval of one ball). In this case, although it is unnecessary to perform the ball position display and the moving operation by the switch as described above, the ball position has to be remembered by the user so that whether the duff occurs is determined based on divot display information.

Thereafter, when the user swings, the club head H contacting the hitting mat 110 during the swing process is detected through the divot-detecting sensor array portion 120, 1) only the contact position at predetermined strength or more is illuminated to be displayed on the LED array display 141 corresponding thereto, or a trajectory of the club head H that may occur differently according to the respective swing characteristics in FIG. 15(B) to 15(E) is illuminated with a red LED. In this case, FIG. 15(B) shows a case of a normal divot after the hitting, FIG. 15(C) shows a case of a duff divot after the hitting, FIG. 15(D) shows a case of a case of an ax shot (down blow), and FIG. 15(E) shows a top ball (a case in which the divot does not occur) after the batting, and 2) the LED array display 141 corresponding thereto is turned on with different brightness according to the intensity of the light.

Figure 17:
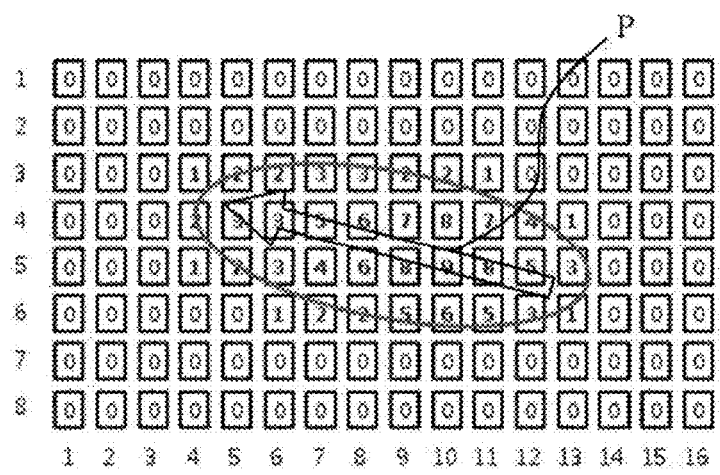
FIG. 17 is a view illustrating an example of a case of a sensor measurement value of a divot-detecting sensor array portion of the divot-detecting golf swing mat according to the second embodiment of the present invention.
Figure 18:
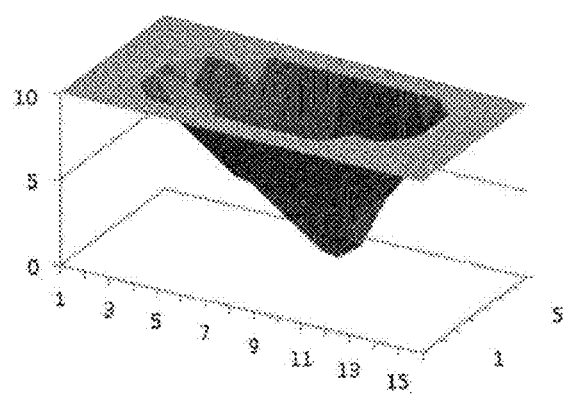
FIG. 18 is a view illustrating a three-dimensional expression of the sensor measurement value of the divot-detecting sensor array portion of the divot-detecting golf swing mat according to the second embodiment of the present invention.

Next, an operation of a divot-detecting golf swing mat according to a second embodiment (two-dimensional sensor array) of the present invention will be described with reference to FIGS. 16 to 18.

In this case as well, the position of the golf ball B is first recognized and displayed on the display portion 140 as before.

Thereafter, when the user swings, the club head H contacting the hitting mat 110 during the swing process is detected through the divot-detecting sensor array portion 120. In this case, measured values measured by each of the sensors two-dimensionally arranged may be arranged as illustrated in FIG. 17. Here, an ellipse indicates a divot region, and a direction of an arrow P indicates a divot direction. In the case of the right-handed user, since the user swings in the left direction, a divot mark occurs from the right direction to the left direction. The divot mark as illustrated in FIG. 17 means a swing trajectory in which the swing trajectory is in-out, i.e., the swing trajectory is directed from the inside to the outside. The measured values measured by the sensors two-dimensionally arranged in the divot-detecting sensor array portion 120 are proportional to a depth of the divot since the values correspond to the impact strength transmitted to the sensors at the corresponding positions. Thus, it is possible to detect the position and depth of the divot as well as the direction of the divot. In order to efficiently transmit such results, it is preferable that the display portion 140 is implemented to be two-dimensionally display (for example, an LED array or a panel display capable of realizing dot matrix display).

Figure 19:
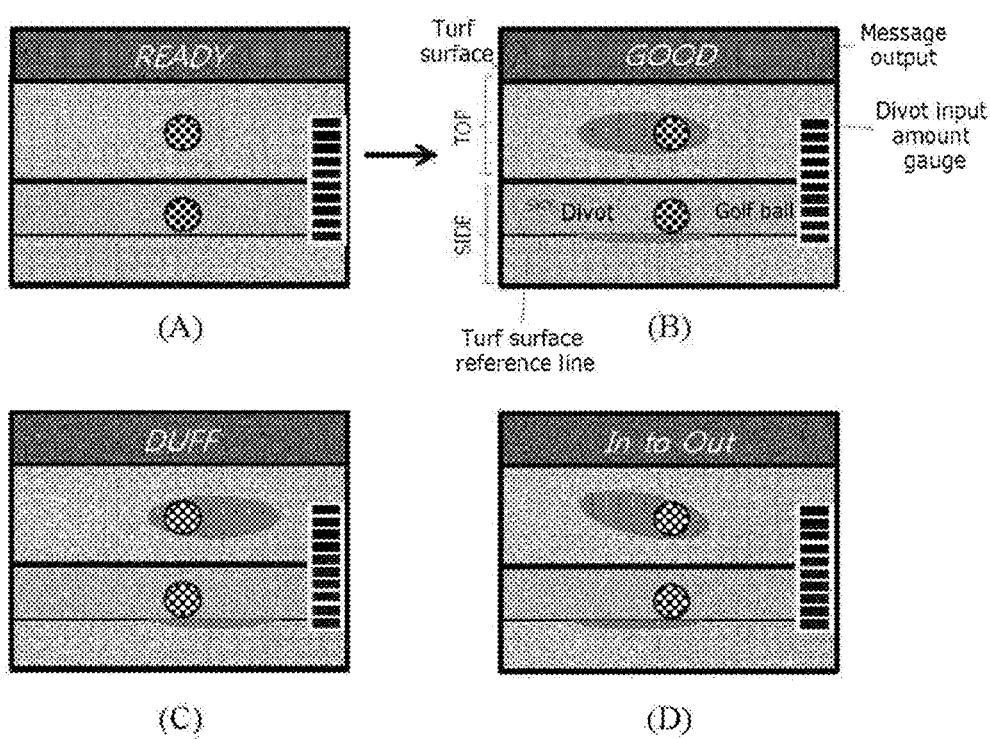
FIG. 19 is a view illustrating an expressed screen of an LCD panel display of a divot-detecting golf swing mat according to a third embodiment of the present invention.

An operation of a divot-detecting golf swing mat according to a third embodiment (constituents including an LED panel display) of the present invention will be described with reference to FIG. 19.

Although the display of the LED array display 141 is inexpensive and simple, there is a limit in information expression. Thus, the LCD display 142 in place of the LED array display 141 or in addition to the LED array display 141 may be provided. In this case, as illustrated in FIG. 19, more intuitive information may be transmitted by displaying images of the swing results when viewed in a cross-section (i.e., a depth of the divot) and a top view (i.e., a shape of the divot). In this case, the screen configuration may be divided into a message output, an image display when viewed on the turf, a cross-sectional image display, and the like, and ground impact strength in a Z-axis direction (a direction from the turf surface to the ground) may be separately visualized as a gauge level. If used in the driving range, golfer's box-related information such as a golfer's box number, a remaining time, the number of hitting ball, and the like or a CF advertisement and the like may be displayed together through the LCD display portion.

As described above, in the case of operating in cooperation with the user's portable terminal through the wired or wireless transmitting or receiving portion 170, the screen display may be performed by the user's portable terminal.

Figure 22:
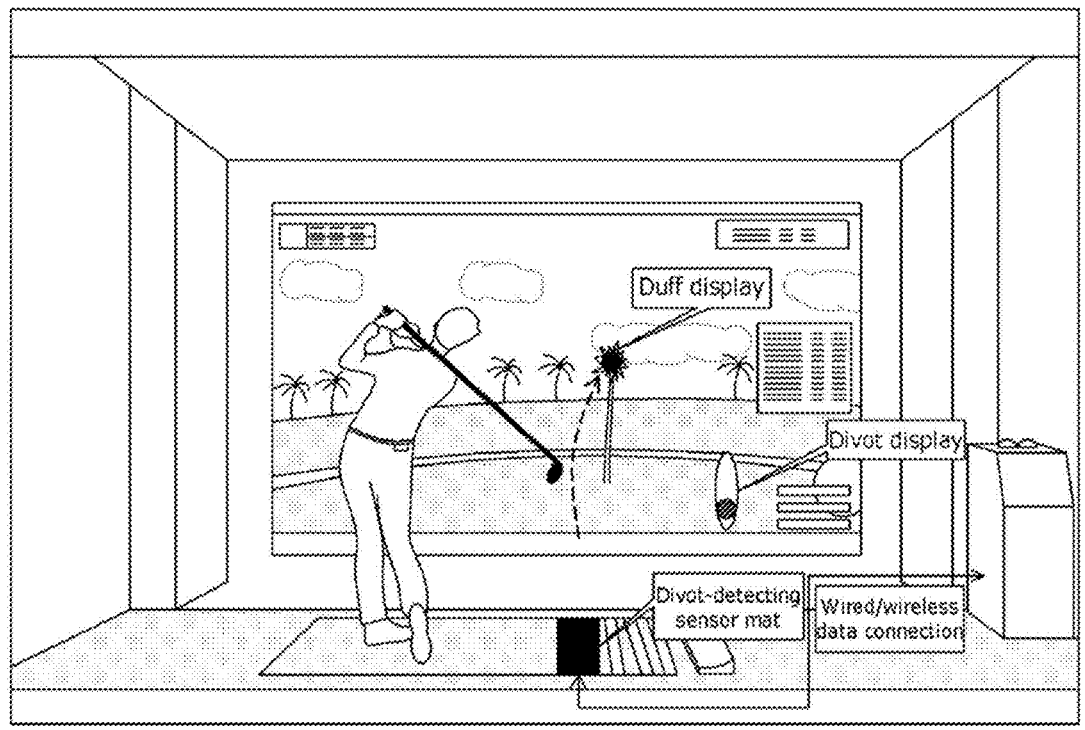
FIG. 22 is a view of a screen golf driving range to which the divot-detecting golf swing mat is applied according to an embodiment of the present invention.
Figure 23:
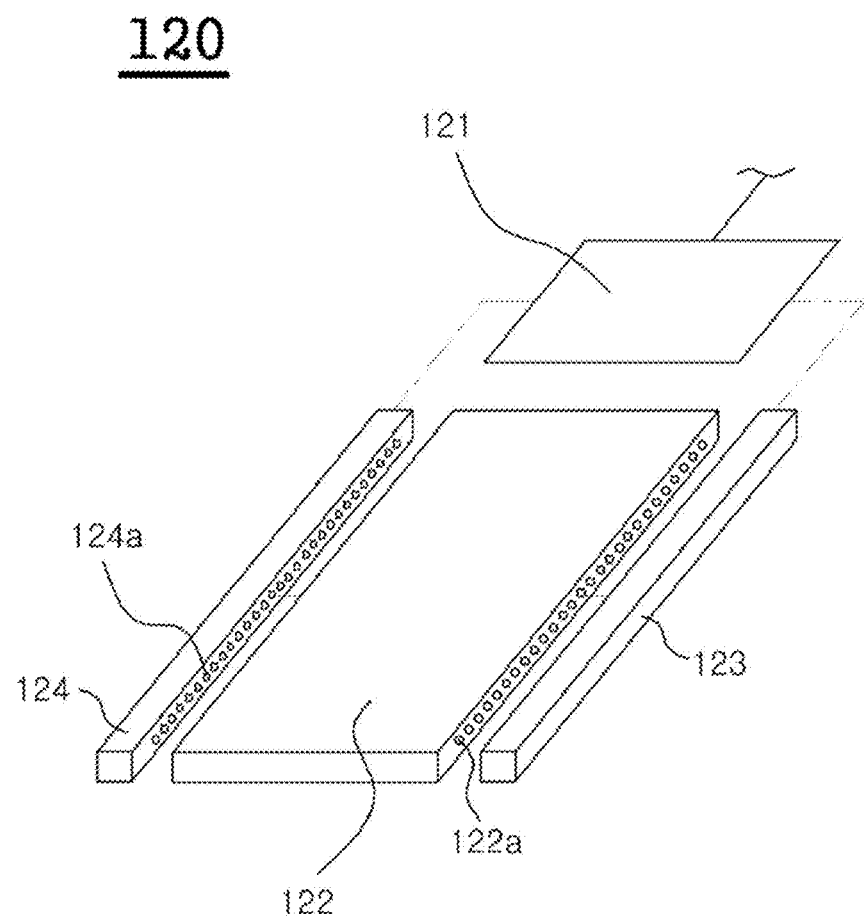
FIG. 23 is a schematic view of a divot-detecting sensor array portion of a divot-detecting golf swing mat according to a fourth embodiment of the present invention.

Also, as illustrated in FIG. 22, it is also possible to operate in cooperation with a golf simulation system such as the screen golf through the wired or wireless transmitting or receiving portion 170. In this case, as described above, the configuration except for the hitting mat 110 provided with the divot-detecting sensor array portion 120 may be implemented by using an input/output device of the golf simulation system. In this case, the position of the golf ball is known by the screen golf system through the camera. When the divot-detecting golf swing mat according to the present invention detects and transmits the divot information, the screen golf system images the ball and the divot. When it is determined that the divot is deep by determining the divot strength of the divot information, the turf may be displayed. Above all, it is also possible to calculate the driving distance by subtracting the driving distance from the screen golf system by applying the weight during the calculation of the driving distance when the divot occurs. In this case, the divot-detecting golf swing mat and the screen golf system according to the present invention may exchange information or issue a control command by using a communication protocol. Also, while the divot-detecting golf swing mat and the screen golf system are synchronized with each other, it is preferable that the main control portion 130 stores the divot information at a predetermined time interval, and then, when the screen system requests the divot information at the time when it is determined that the golfer hits the ball to the main control portion 130, the corresponding divot information is transmitted to the screen system.

Hereinafter, another example of the divot-detecting sensor array portion 120 of the configurations of the divot-detecting golf swing mat according to the present invention will be described.

Figure 24:
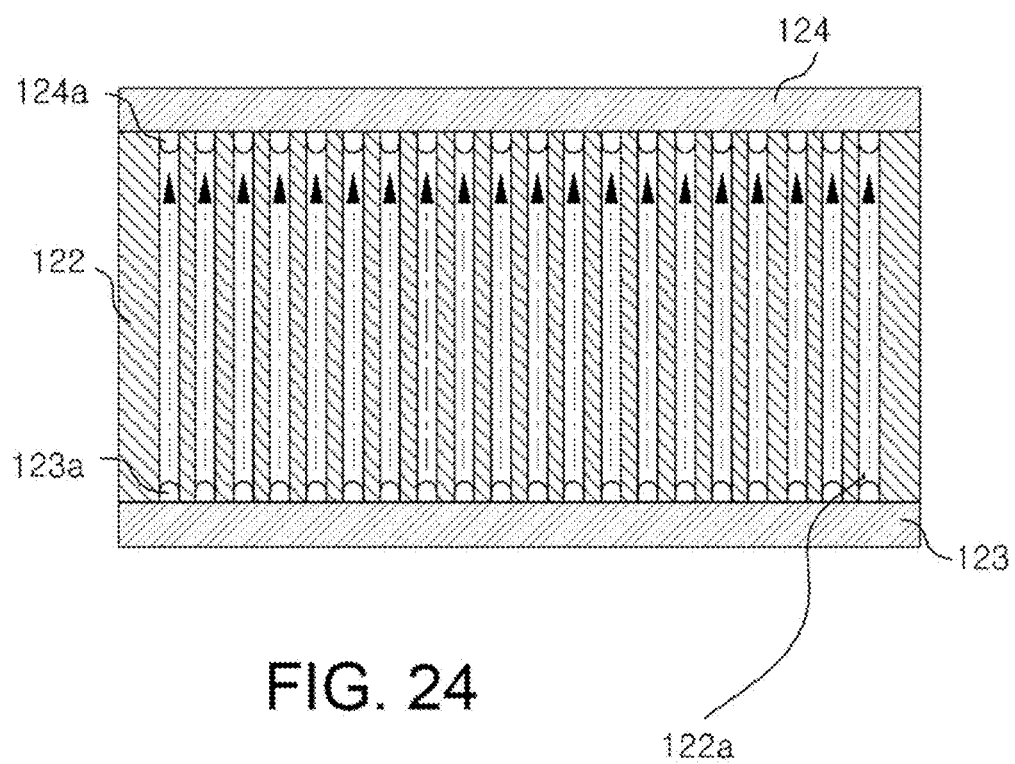
FIG. 24 is a view of the divot-detecting sensor array portion of the divot-detecting golf swing mat according to the fourth embodiment of the present invention.

As illustrated in FIG. 24, the divot-detecting sensor array portion 120 includes a sensor portion constituted by a body plate 122, a first light emitting portion 123, a first light receiving portion 124, a second light emitting portion 125, and a second light receiving portion 126 and a sensor signal detecting portion 121. An impact detection sensor system constituted by a combination of transmission and reception of light and a body plate 122 made of an elastic material (e.g., a silicone rubber plate or the like) is applied to the divot-detecting golf swing mat.

The body plate 122 has to be excellent in elasticity and restoring force so that the body plate 122 is restored to its original state after being compressed by an impact of bottom hitting during the swing, and when considering the outdoor use, it should have constant physical properties regardless of temperature change. Thus, it is highly desirable to be made of silicone rubber having such excellent properties. A compression set of general organic rubber remarkably increases with a temperature change. However, the silicone rubber retains elasticity and resilience over a wide temperature range from −100° C. to 250° C. Thus, if compressive deformation is required under extreme conditions, the silicone rubber has excellent performance, for example, physical properties are hardly changed due to excellent weather resistance even though the silicone rubber is left in outdoors for a long time, and also, physical properties are hardly changed due to excellent chemical resistance and hot water resistance even through the silicone rubber is exposed to chemicals or water for a long time.

A plurality of first through-holes 122a are formed in the body plate 122 in a direction perpendicular to the swing direction of the club head H.

Also, a first light emitting portion 123 provided with a plurality of first light emitting sensors 123a at a position corresponding to the plurality of first through-holes 122a is formed on one side of the body plate 122, a first light receiving portion 124 provided with a plurality of first light receiving sensors 124a, which is formed at a position corresponding to the plurality of first through-holes 122a to recognize light passing through the plurality of first through-holes 122a and generated from the first light emitting portion 123 is formed on the other side of the body plate 122, and a sensor signal detecting portion 121 connected to the first light emitting portion 123 and the first light receiving portion 124 to measure an amount of light passing through the plurality of first through-holes 122a and transmit the measured amount of light to the control portion 130 is provided.

Here, the plurality of first through-holes 122a has a circular or rectangular cross-sectional shape, but is not limited to a specific shape.

The first light emitting portion 123 generally uses a plurality of light emitting sensors (for example, an infrared LED, a visible light LED, etc.) and performs on/off control in the control portion 130 through the sensor signal detecting portion 121.

Also, the second light receiving portion 124 generally uses a plurality of light receiving sensors (e.g., phototransistors, photodiodes, etc.), and an analog received signal of the individual light receiving sensor is converted into a digital signal through the sensor signal detecting portion 121 and transmitted to the control portion and then stored in a memory.

When the first light emitting sensor 123a or the first light receiving sensor 124a is disposed, a plurality of optical cables (not shown) are disposed at an inlet of the plurality of first through-holes 122a for convenience to guide the emission of the remote first light emitting sensor 123a and the light of the remote first light receiving sensor 124a.

Due to this configuration, in a normal state, the light emitted from the first light emitting sensor 123a reaches the first light receiving sensor 124a along the plurality of first through-holes 122a.

If the body plate 122 is compressed by the impact of the hitting mat 110, the inside of the plurality of first through-holes 122a may be narrowed or completely closed according to an amount of impact. Here, an amount of light received into the first light receiving sensor 124a may be reduced or blocked.

When the impact of the hitting mat 110 is disappeared, the body plate 122 enables the plurality of first through-holes 122a to return to its original shape by elastic force and restoring force of the material.

Figure 25:
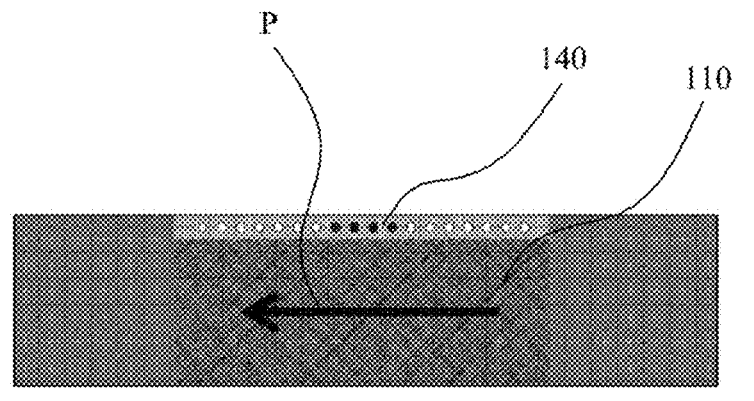
FIG. 25 is plane and cross-sectional views of the divot-detecting golf swing mat according to the fourth embodiment of the present invention.
Figure 25:
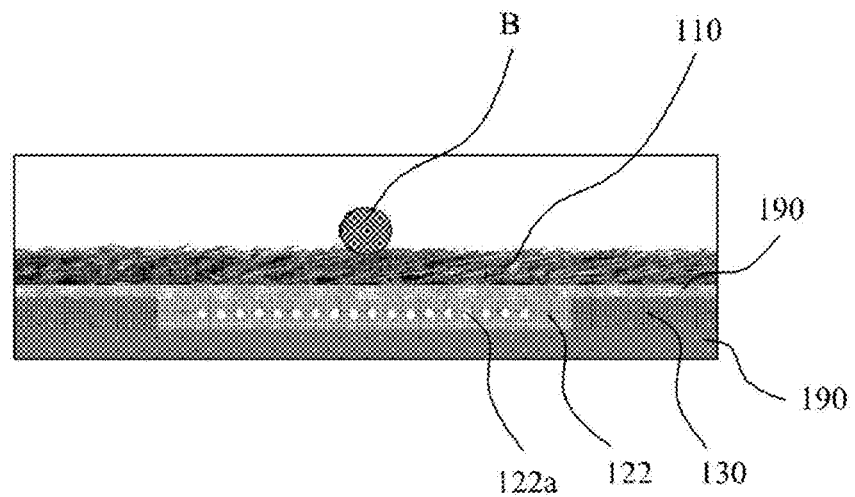

FIG. 25 illustrates a top view and a cross-sectional view of a divot-detecting golf swing mat including the body plate 122 and an impact sensing device through the first light emitting portion 123 and the first light receiving portion 124.

Since artificial turf is generally made in a weaving method, the bottom surface is uneven. Thus, a thin urethane rubber mat layer adheres to make a smooth surface and to absorb an extra impact.

The body plate 122, the first light emitting portion 123, and the first light receiving portion 124 are installed under the urethane rubber mat layer. It is preferable that the artificial turf including the urethane rubber layer does not permanently adhere to the body plate 122 so that the urethane rubber layer is replaced because the artificial turf is worn according to the use time and therefore needs to be replaced.

Also, a hard rubber mat layer is disposed on a lower portion of the body plate 122 to absorb the hitting impact and maintain rigidity of the entire mat.

It is preferable that all the components including the control portion 130 are installed outside a hitting range at a lower end of the artificial turf, i.e., at one side or both sides of the outside of the body plate 122, in plurality of first through-holes 122a is not disposed. Also, the artificial turf may be left outside the effective hitting range, the outside of the effective hitting range may be left empty, or billboards or LCD panels may be installed outside the effective hitting range.

Figure 26:
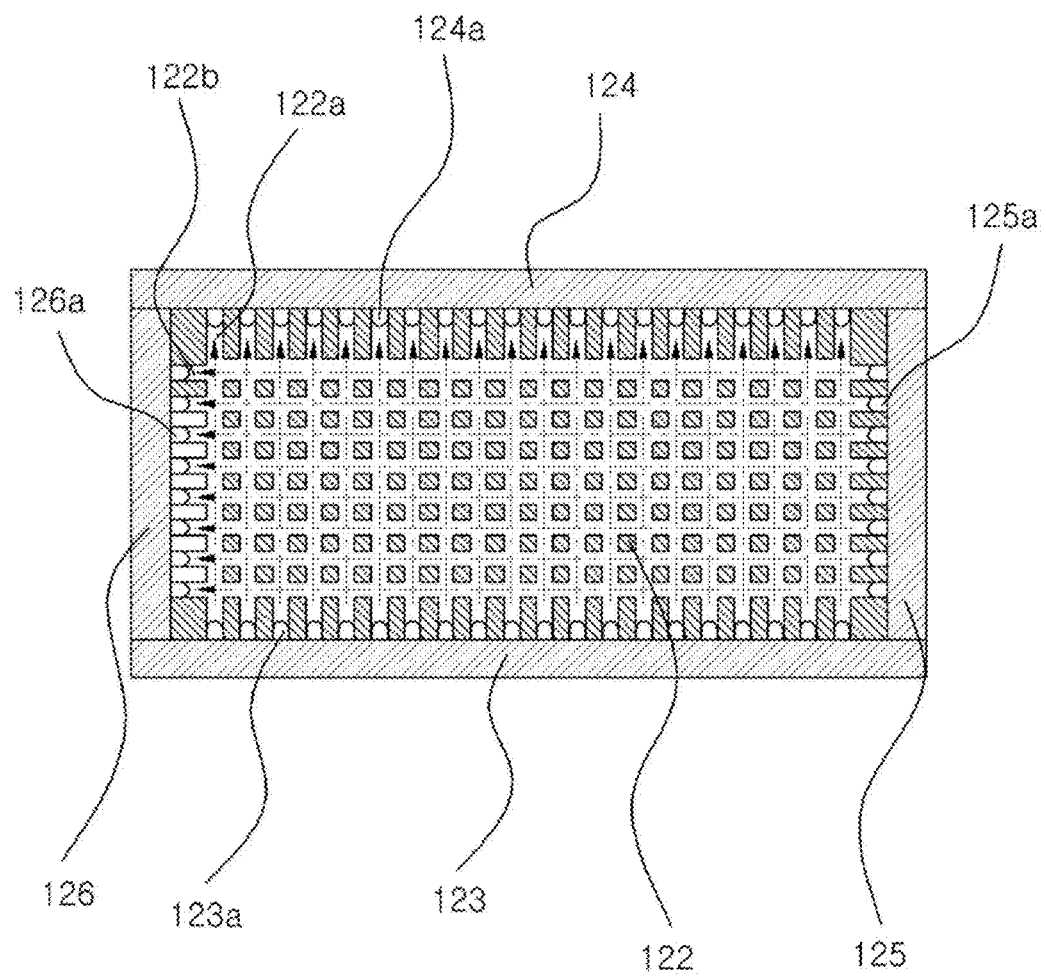
FIG. 26 is a view illustrating a divot-detecting sensor array portion of a divot-detecting golf swing mat according to a fifth embodiment of the present invention.

As illustrated in FIG. 26, the divot-detecting sensor array portion 120 includes a plurality of second through-holes 122b formed in the main plate 122 in a direction perpendicular to each of the plurality of first through-holes 122a formed in the main plate 122 to obtain the divot information for determining a two-dimensional direction.

For this, a second light emitting portion 125 provided with a plurality of second light emitting sensors 125a at a position corresponding to the plurality of second through-holes 122b is formed on a distal end of the body plate 122, a second light receiving portion 126 provided with a plurality of second light receiving sensors 126a, which is formed at a position corresponding to the plurality of second through-holes 122b to recognize light passing through the plurality of second through-holes 122b and generated from the second light emitting portion 125 is formed on a front end side of the body plate 122, and the sensor signal detecting portion 121 measures an amount of light passing through the plurality of second through-holes 122b to transmit the measured amount of light to the control portion 130.

Figure 27:
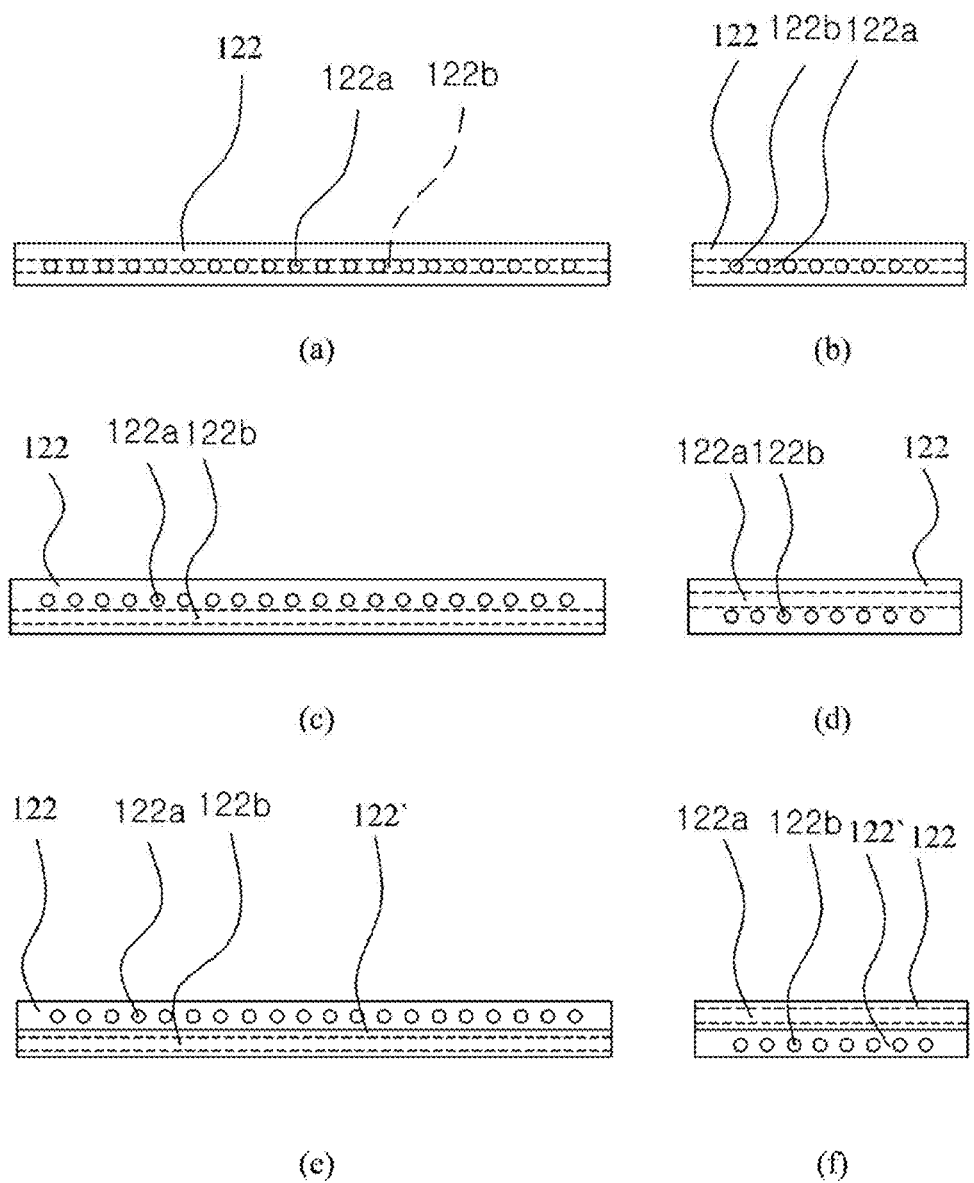
FIG. 27 is a view illustrating various examples of first and second through-holes of the divot-detecting golf swing mat according to the fifth embodiment of the present invention.

As illustrated in FIG. 27, a method for disposing the plurality of first through-holes 122a and the plurality of second through-holes 122b which are perpendicular to each other, on the horizontal and vertical sides of the body plate 122 in the silicone rubber plate includes a method of disposing the plurality of first through-holes 122a and the plurality of second through-holes 122b which are arranged horizontally and vertically on the same plane within one sheet of body plate 122 made of an elastic material, as illustrated in FIGS. 27(A) and 28(b), a method for disposing the plurality of first through-holes 122a and plurality of second through-holes 122b, which are horizontally and vertically on different planes within one sheet of body plate 122 made of an elastic material, as illustrated in FIGS. 27(c) and 27(d), and a method for vertically superposing the body plate 122 made of an elastic material and having the plurality of first through-holes 122a and another body plate 122' made of an elastic material and having the plurality of second through-holes 122b as illustrated in FIGS. 27(e) and 27(f).

When the user presses the golf ball B for a predetermined time in a state in which the golf ball B is placed on the upper portion of the hitting mat 110 by using the divot-detecting sensor array portion 120 having the above-described structure, the body plate 122 disposed at the portion pressed by the pressing force is pressed, and thus, the light emitted from each of the first light emitting portion 123, the first light receiving portion 124, the second light emitting portion 125, and the second light receiving portion 126 passes through the plurality of first through-holes 122a and the plurality of second through-holes 122b which are disposed at the positions at which the body plate 122 is pressed. Thus, the divot-detecting sensor array portion 120 detects and transmits the detected result to the control portion 130 to inform the position of the golf ball B.

It is possible to discriminate the presence or absence of the impact, the impact strength, and the impact holding time from signals of the first and second light receiving sensors 124a and 126a.

The light outputted from the first and second light emitting sensors 123a and 125a reaches almost the respective first and second light receiving sensors 124a and 126a, and a sensor output value is maintained constantly at a large value.

Figure 28:
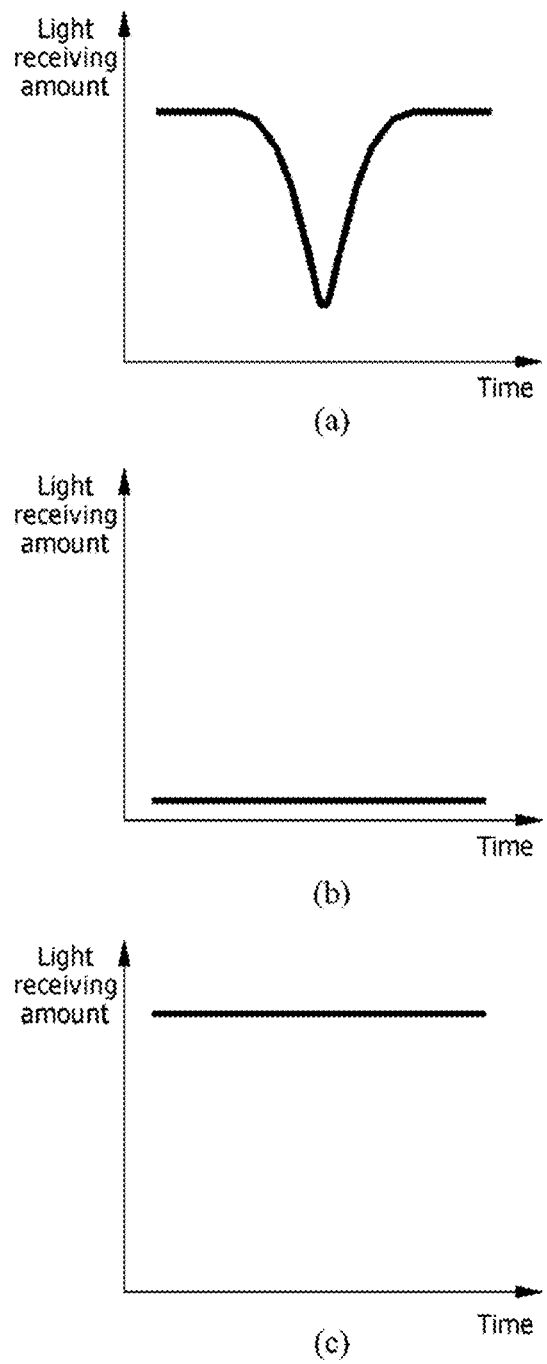
FIG. 28 is a graph illustrating a difference in light receiving amount depending on whether an impact exists in the divot-detecting golf swing mat according to the fifth embodiment of the present invention.

When a short-term impact is applied to the upper end of the body plate 122, the sensor output value is temporarily lowered rather than that in the normal state and then restored to its original state, as illustrated in FIG. 28(*a*).

Figure 29:
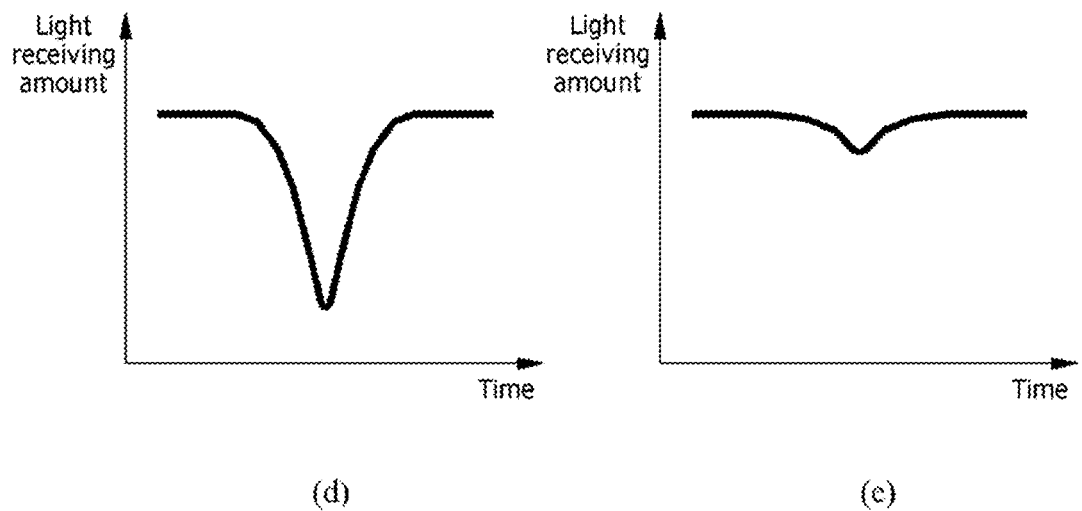
FIG. 29 is a graph illustrating a variation in light receiving amount depending on an impact intensity in the divot-detecting golf swing mat according to the fifth embodiment of the present invention.

The more the impact strength increases, the more a depth of a downward peak is deeper as in FIG. 29(*d*).

In the case of the long-lasting impact as long as the hitting mat 110 is stepped, the sensor output value will be maintained constantly at a low value as illustrated in FIG. 28(*b*).

Figure 30:
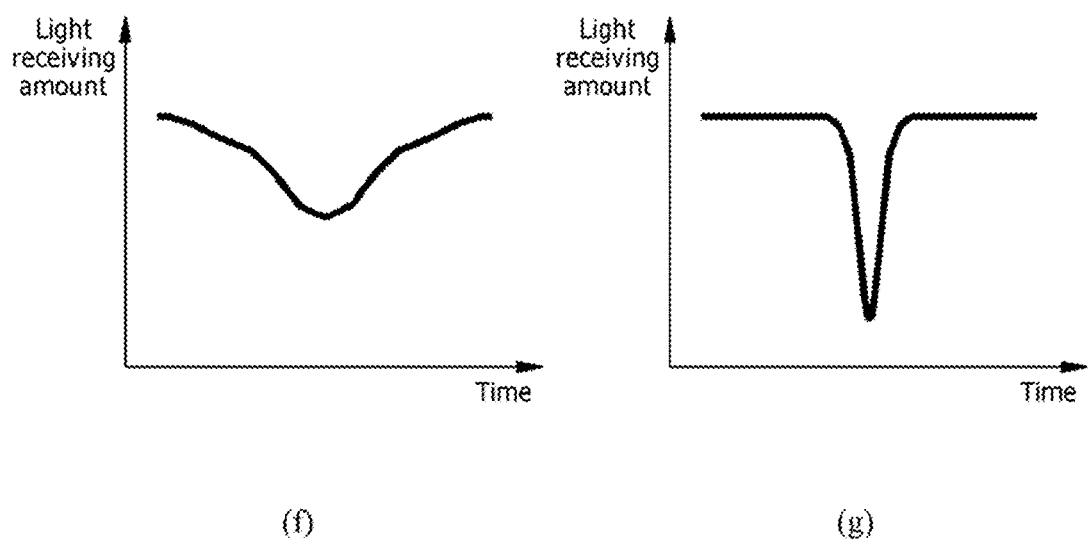
FIG. 30 is a graph illustrating a variation in light receiving amount depending on an impact time in the divot-detecting golf swing mat according to the fifth embodiment of the present invention.

The more the duration of the impact is short, the more the duration of the value lower than that in the normal state is short, as illustrated in FIG. 30(*g*). When an occurrence of the downward peak and the impact duration are calculated from a plurality of receiving sensor waveforms stored in the memory, only in the case of the hitting by the swing, an amount of impact applied to the periphery of each of the plurality of first through-holes 122a and plurality of second through-holes 122b is calculated to display the divot information. Since the calculated amount of impact has a step value ranging from 0 to 100, when displayed on the LED, an amount of divot may be displayed with brightness corresponding to the step value. For example, if a value 50 of the impact amount is medium brightness, a value 80 of the impact amount is 60% brighter than the medium brightness, and if a value 10 of the impact amount, the brightness is lowered to 20% of the medium brightness and then displayed on the LED. In this way, it is possible to display more realistic divot display because a center of the divot is expressed brightly, and the periphery is displayed less bright than the display of the divot amount by binarization. That is, the more the LED brightness increases, the more the impact amount and the deep of the divot increase.

Hitherto, the best mode was disclosed in the drawings and specification. While specific terms were used, they were not used to limit the meaning or the scope of the present invention described in claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying claims.

The invention claimed is:

1. A divot-detecting golf swing mat comprising:
a hitting mat (110) having artificial turf (111) formed on an upper side thereof so that a golf ball (B) is seated thereon;
a divot-detecting sensor array portion (120) installed beneath the hitting mat (110) so as to measure hitting of a club head (H), the divot-detecting sensor array portion (120) comprising sensors arranged in an array type;
a control portion (130) controlling a display portion (140) to display information regarding the hitting of the club head (H) detected by the divot-detecting sensor array portion (120) on the display portion (140);
a golf ball position designating portion (150) for designating a position of the golf ball (B) randomly placed by a user on the hitting mat (110) and transmitting the position designated by the golf ball position designating portion (150) to the control portion (130);
wherein the divot-detecting sensor array portion (120) is configured so that the sensors are arranged in a direction perpendicular to a swing direction of the club head (H), and the divot-detecting sensor array portion (120) comprising:
(1) a body plate (122) made of an elastic material and having a plurality of first through-holes (122a) arranged in a direction perpendicular to the swing direction of the club head (H);
(2) a first light emitting portion (123) on a first side of the body plate (122) and provided with a plurality of first light emitting sensors (123a) at positions corresponding to the plurality of first through-holes (122a),
(3) a first light receiving portion (124) on a second side of the body plate (122) and provided with a plurality of first light receiving sensors (124a), which are formed at positions corresponding to the plurality of first through-holes (122a) to recognize light passing through a through hole of the plurality of first through-holes (122a) and generated from the first light emitting portion (123),
(4) a sensor signal detecting portion (121) connected to the first light emitting portion (123) and to the first light receiving portion (124) to measure an amount of light passing through the plurality of first through-holes (122a) and transmit the measured amount of light to the control portion (130),
wherein the display portion (140) is configured with an LED array display (141) in which LEDs are arranged in one dimension in the swing direction of the club head H, and
wherein the golf ball position designating portion (150) includes at least one of a touch screen portion (151), a button switch portion (152), and a proximity switch portion (153) to detect a contact position of the club head (H) and transmits the contact position to the control portion (130) to modify the LED array display (141).

2. The divot-detecting golf swing mat of claim 1, wherein the touch screen portion (151) is constituted by touch sensors one-dimensionally arranged in the swing direction of the club head (H), and
the control portion (130) determines the position of the golf ball (B) according to the contact position of the club head (H) contacting the touch screen portion (151).

3. The divot-detecting golf swing mat of claim 2, wherein the control portion (130) generates divot information comprising one or more of a position of a virtual divot, a depth of the virtual divot, and a direction of the virtual divot according to hitting information of the club head (H), and
the divot-detecting golf swing mat further comprises:
a voice output portion (160) further connected to the control portion (130) to convert the divot information to a voice;
a camera (171) further connected to the control portion (130) to photograph the position of the golf ball (B) so as to be transmitted to the control portion (130);
a temperature sensor portion (172) further connected to the control portion (130) to measure a temperature for compensating temperature characteristics of the divot-detecting sensor array portion (120); and an advertisement display portion (180) further connected to the control portion (130) to display an advertisement.

4. The divot-detecting golf swing mat of claim 3, further comprising one of a wired and wireless transmitting portion (170) further connected to the control portion (130) to transmit the hitting information of the club head (H) to one or more of a golf simulation system and a portable terminal of a user.

\* \* \* \* \*